(12) United States Patent
Madril

(10) Patent No.: US 11,674,655 B2
(45) Date of Patent: Jun. 13, 2023

(54) SYSTEM AND METHOD FOR HIGH EFFICIENCY FORWARD LIGHTING COLLIMATING PROJECTION SYSTEM

(71) Applicant: Edgar Madril, Mesa, AZ (US)

(72) Inventor: Edgar Madril, Mesa, AZ (US)

( * ) Notice: Subject to any disclaimer, the term of this patent is extended or adjusted under 35 U.S.C. 154(b) by 0 days.

(21) Appl. No.: 17/375,579

(22) Filed: Jul. 14, 2021

(65) Prior Publication Data

US 2023/0025064 A1    Jan. 26, 2023

(51) Int. Cl.

| | |
|---|---|
| *G02B 13/00* | (2006.01) |
| *F21S 41/25* | (2018.01) |
| *F21S 41/143* | (2018.01) |
| *G02B 19/00* | (2006.01) |
| *F21S 45/48* | (2018.01) |
| *F21V 5/00* | (2018.01) |
| *G02B 3/04* | (2006.01) |
| *G02B 27/30* | (2006.01) |

(52) U.S. Cl.
CPC ............. *F21S 41/25* (2018.01); *F21S 41/143* (2018.01); *F21S 45/48* (2018.01); *F21V 5/008* (2013.01); *G02B 3/04* (2013.01); *G02B 19/0061* (2013.01); *G02B 27/30* (2013.01)

(58) Field of Classification Search
None
See application file for complete search history.

(56) References Cited

U.S. PATENT DOCUMENTS

| | | | |
|---|---|---|---|
| 8,562,152 B2 | 10/2013 | Akiyama | |
| 9,164,263 B2 | 10/2015 | Inoko | |
| 2003/0164901 A1* | 9/2003 | Ouchi | G02B 26/124 |
| | | | 348/E9.027 |
| 2012/0063157 A1* | 3/2012 | Nakazato | F21S 41/176 |
| | | | 362/517 |
| 2015/0192770 A1* | 7/2015 | Saito | G02B 3/04 |
| | | | 359/645 |
| 2020/0158310 A1* | 5/2020 | Brick | F21V 5/008 |

FOREIGN PATENT DOCUMENTS

| | | |
|---|---|---|
| JP | 11-167064 A | 6/1999 |
| JP | 4661149 B2 | 1/2011 |

* cited by examiner

*Primary Examiner* — Elmito Breval
(74) *Attorney, Agent, or Firm* — Accelerate IP

(57) ABSTRACT

A forward projecting condensing and collimating optical platform enables the ability to more effectively utilize the light generated from a Lambertian light source. The optical system can effectively utilize light emitted from a 120-degree source viewing angle over a substantially large extended field of view. The optical system can project a high intensity light in a smaller packaging envelope. The optical design can be used for generation of hi-Intensity spot beams, fog lamps, head lamp low beams, head lamps, hi beams, a driving beam, and the like, while operating at a lower power input to equivalent optical systems.

20 Claims, 11 Drawing Sheets

SYSTEM AND METHOD FOR HIGH EFFICIENCY FORWARD LIGHTING COLLIMATING PROJECTION SYSTEM

BACKGROUND OF THE INVENTION

The present invention generally relates to lighting systems, and more particularly to lighting systems distributing light from a vehicle.

DESCRIPTION OF RELATED ART

Lighting systems in exterior forward projecting after market and standard automotive lighting industry have historically been inefficient in utilizing all light generated by a light source to an effective collimated projection state. Collimated light emission from an optical system is one element of design for high intensity spot lamps, head lamps, driving beams, and fog lamps. In general, most systems in the automotive market utilize roughly 50% of the light created by a given light source because the light emitted from a light source is either not used or poorly collimated. Light not collected by a given optical system is either obscured by the light housing or spilled into the peripheral of the intended beam pattern.

Lighting systems generally come in two different designs: reflector designs and refractor designs. Reflector designs have a light source in front of a mirror surface in a generally parabolic shape. Light is reflected in a direction that is defined by the angle to the light source and the shape of the reflector surface. Spill light may be subtended through the opening of a given reflector and the light source itself may serve as a central obscuration preventing some light from the intended path. As a consequence, reflector designs require larger focal lengths resulting in larger packaging envelopes. In addition, reflective systems commonly have varying magnification dependent on incident ray location on parabolic surface(s). Rays that reflect off a location near a parabolic mirror's apex tend to diverge much greater than rays that reflect further away from the mirror's apex resulting in poor collimation. As a result, off axis parabolic mirror(s) are used to direct light reflected near a mirror's apex downwards as spill light to meet fog lamp and headlamp beam requirements.

Refracting systems do not have the same problems as reflective systems but have their own challenges. Corresponding refracting systems are limited by a source's numerical aperture, which characterizes the range of angles over which an optical system can collimate light (make the light rays accurately parallel). Refracting systems do not have issues with magnification and can sharply collimate light over an extended field of view, but refracting systems tend to incorporate more transmission loss by Fresnel Reflections and limited throughput defined by the system's numerical aperture. Hybrid Optics can utilize 100% of all light emitted from a Lambertian source but require rotational symmetry to be efficient. Hybrid Optics also have effects of varying magnification resulting in poor sharpness in cutoff lines and lower beam intensities.

LED light sources offer rugged designs as components are single solid-state elements that can endure a broad range of environmental conditions and long operational spans. LED technology has greatly improved over the past few decades making them ideal light sources for a broad range of applications. The challenges with LED sources are wide angle emission (120-degree industry standard) and thermal management. Most optical systems that integrate LED sources have optical performances that are limited by an acceptable numerical aperture from a Lambertian light emission that results in usable collimated light. As a result, most forward projecting lighting systems are not power efficient as large portions of light generated by an LED are not effectively utilized. In general, the inability to utilize all light effectively results in multiple sources and optics used to achieve desired optical function. Multiple sources and inability to utilize all light from a given light source decreases power efficiency, increases complexity in assembly, thermal management and ultimately cost.

BRIEF SUMMARY OF THE INVENTION

The present invention provides, among other things, an optical design that effectively utilizes 100% light emission from a 120-degree source viewing angle into an effective collimated projection. The invention is configured such that a simple change in surface geometry can diverge collimation along either an azimuthal or elevation axis enabling the ability to make a beam pattern unique to a given forward projecting illumination application. The invention summary herein describes a design form that can be used to create various optical designs that stem off the ability to collimate light in an efficient and compact manner. The ability to effectively utilize approximately all light emitted from a Lambertian emitting source to a collimated condition can have the benefit of higher optical power output, higher optical beam intensity, and smaller packaging sizes while requiring a lower input of electrical power. The applications of the design can extend to many different forward projecting systems such as spot lamps, driving beams, fog lamps, and low beams, and the like.

It is an object of the invention to utilize all light created from a source with a 120-degree viewing angle or larger.

It is another object of the invention to effectively collimate light from a 120-degree viewing angle or larger.

It is another object of the invention to create a high brightness low power consuming spot lamp.

It is another object of the invention to create a high brightness low power consuming fog lamp.

It is another object of the invention to create a high brightness low power consuming head lamp low beam.

It is another object of the invention to create a high brightness low power consuming head lamp hi beam.

It is another object of the invention to create a high brightness low power flashlight.

The above and other objects may be achieved using devices involving a light system with a light source coupled to a housing face forward in the direction that the light will travel when leaving the housing. The light source can be an incandescent light, an HID or an LED, and may be smaller than about 5 mm square.

At least one condensing lens is in the light path of the light source and is positioned relative to the light source to encompass the light source and take in substantially all the light that is emitted by the light source. The condensing lens or lenses condense the light into a light beam that is taken in by a collimator shaped and positioned relative to the condensing lens or lenses to encompass the entire area of the light beam. In a particular embodiment, the lens is substantially composed of polycarbonate.

At least one of the condensing lenses may be a positive meniscus lens, or the condensing lenses may be two positive meniscus lenses. The positive meniscus lens or other condensing lens may have at least one aspheric surface. The length of the system and the effective focal length of the system may have a ratio that is less than about 0.6. The light emitted by the light source is subtended by a first angle and the light exiting the condensing lens or lenses is subtended by a second angle that is less than the first angle, and the ratio of the first angle to the second angle is between about 1.5 and 2.5.

The collimator of the system may comprise at least one of a plano-convex refracting lens, a series of refractive lenses, at least one reflective mirror, a binary optic, or a Fresnel lens. In a particular embodiment, the collimator is a plano-convex lens and is modified to have at least one of lenticular flutes, off-axis fly eye lens geometries, or wedged surface patches. The collimator may be achromatic and may have an effective focal length large enough to subtend a beam angle less than about 6 degrees. The system has at least 70% effective transmission including Fresnel reflection losses and at least 96% effective transmission excluding Fresnel reflection losses.

The above and other objects may be achieved using methods involving providing a high intensity forward projection optical system by securing a light source to the housing and placing at least one condensing lens relative to the light source to encompass substantially the entire area of the light emitted by the light source and condenses the light into a light beam.

A collimator may be placed and positioned relative to the condensing lens or lenses to encompass the entire area of the light beam. The housing may be secured to a vehicle and connected to the power source of the vehicle. The condensing lens or lenses may be positive meniscus lenses. The condensing lens or lenses may be arranged with the collimator such that together they have an effective focal length (efl), and the ratio of the efl to the length of the system L is less than about 0.6. The collimator can be a plano-convex lens, and the plano surface may be modified to have at least one of lenticular flutes, off-axis fly eye lens geometries, or wedged surface patches. The collimator may also be achromatic.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any sequence or embodiment.

DETAILED DESCRIPTION OF THE INVENTION

In the following description, and for the purposes of explanation, numerous specific details are set forth to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices, and technologies to which the disclosed inventions may be applied. The full scope of the inventions is not limited to the examples that are described below.

Figure 1:
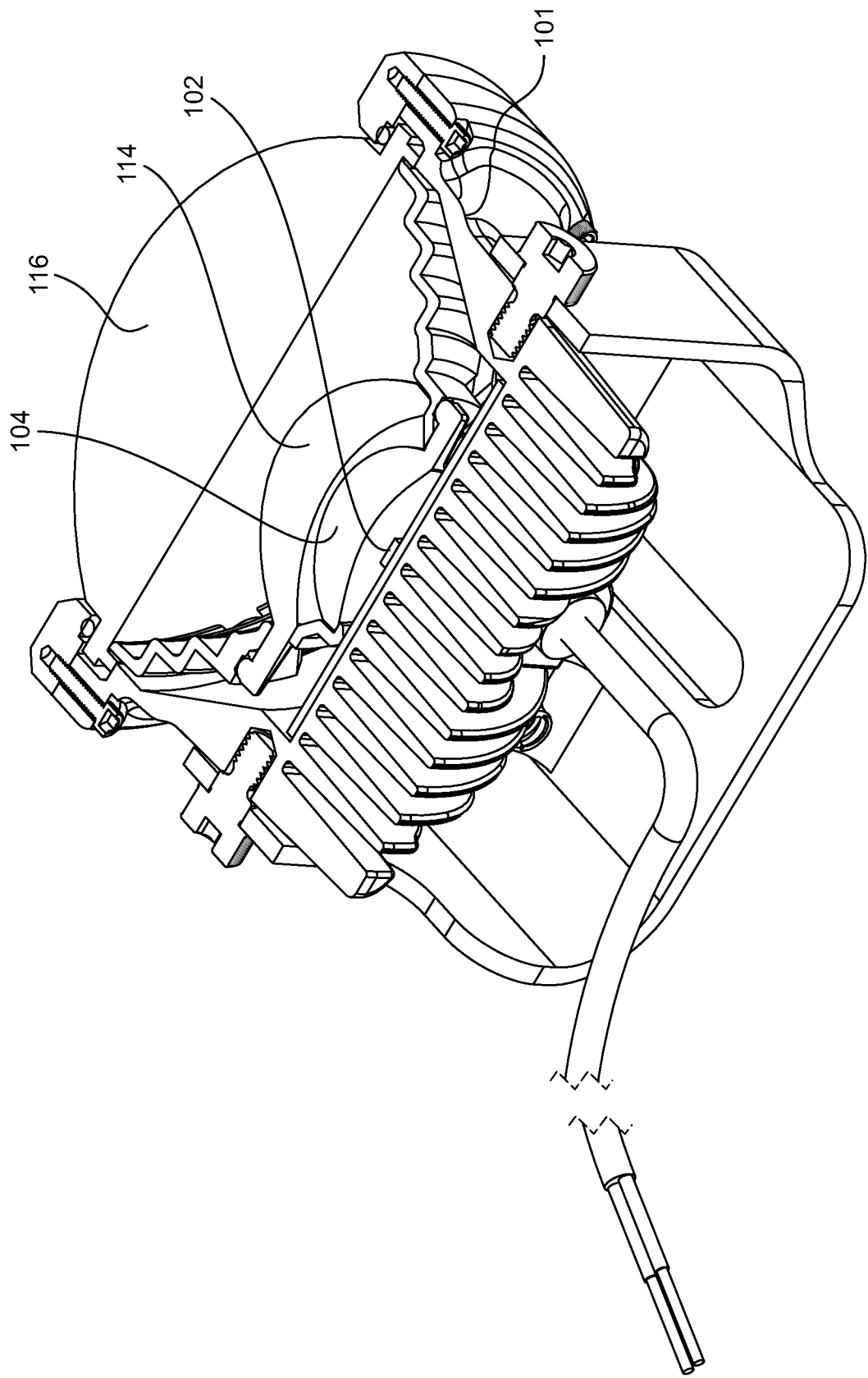
FIG. 1 depicts a cross sectional view of one embodiment of the optical system packaged into a mechanical housing giving particular view of one embodiment of the Plano surface in the collimator used for a high intensity spot beam in accordance to one, or more embodiments.
Figure 2:
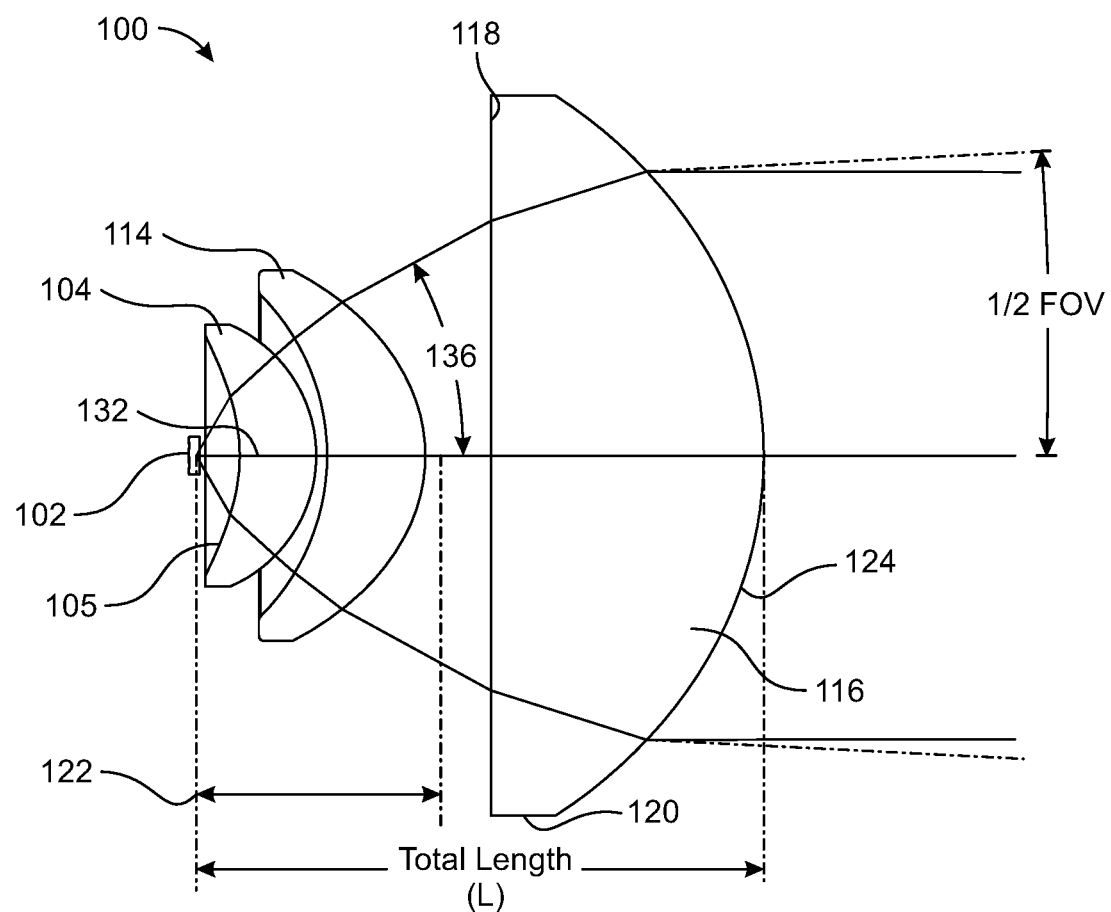
FIG. 2 depicts a cross sectional view of the nominal ray path of a 120-degree source viewing angle in accordance to one, or more embodiments.
Figure 3:
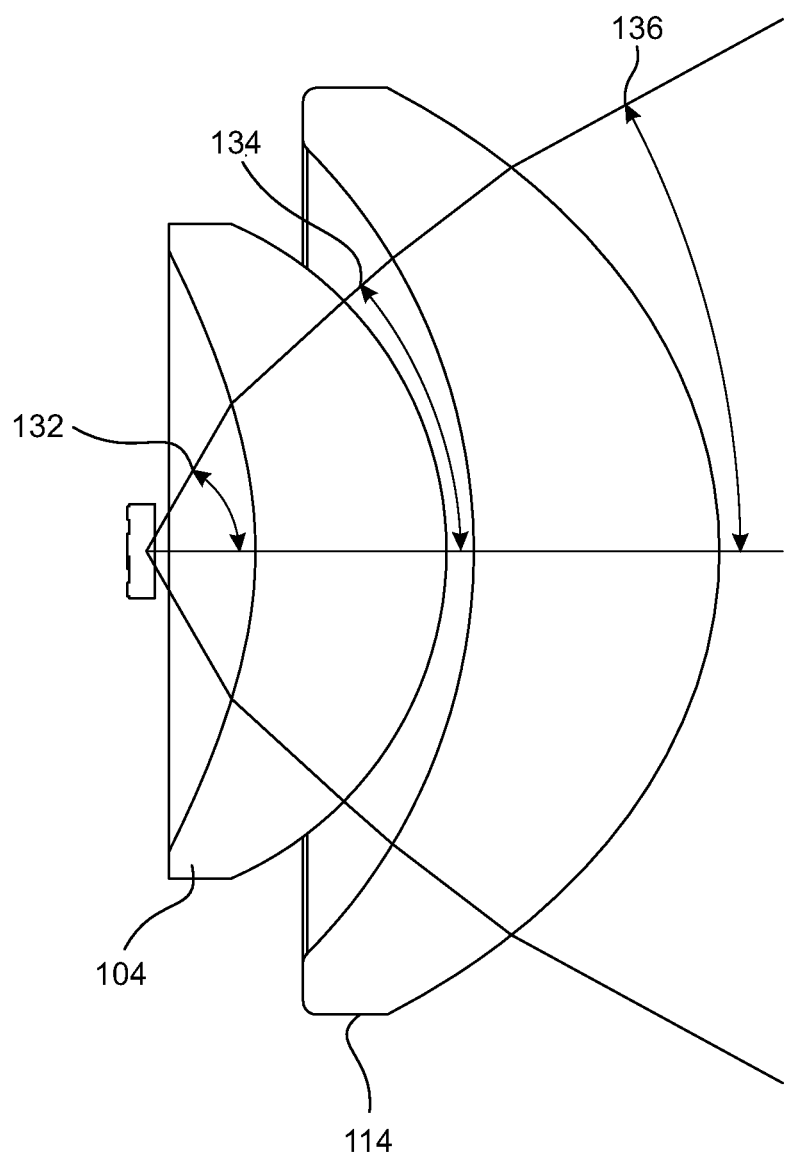
FIG. 3 depicts the condensing lens group in accordance to one, or more embodiments.
Figure 4:
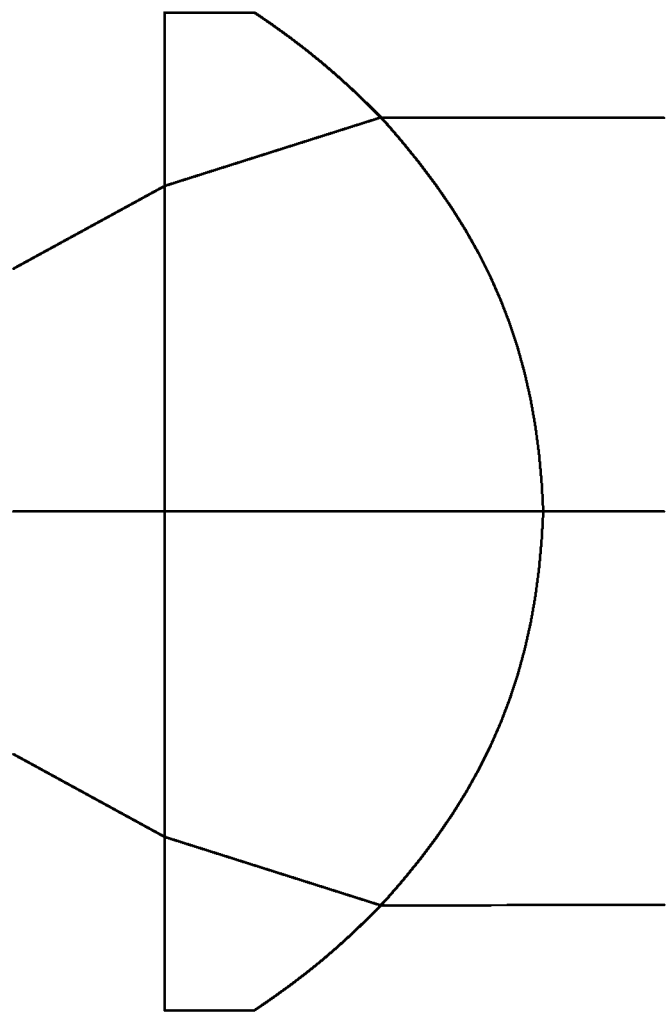
FIG. 4 depicts the collimator in accordance to one, or more embodiments.
Figure 5B:
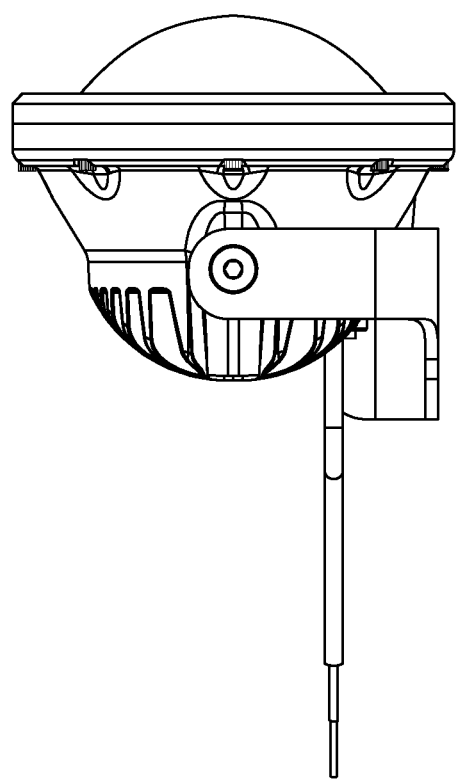
FIG. 5b depicts a right view of one embodiment of the optical system within a mechanical housing in accordance to one, or more embodiments.
Figure 5A:
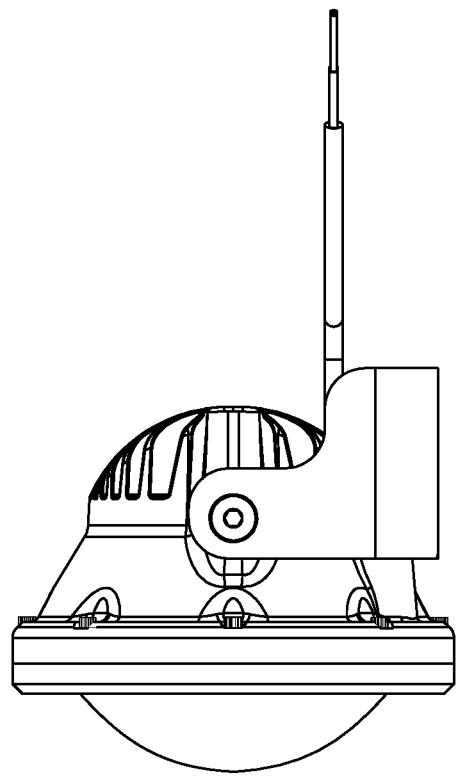
FIG. 5a depicts a left view of one embodiment of the optical system within a mechanical housing in accordance to one, or more embodiments.
Figure 5D:
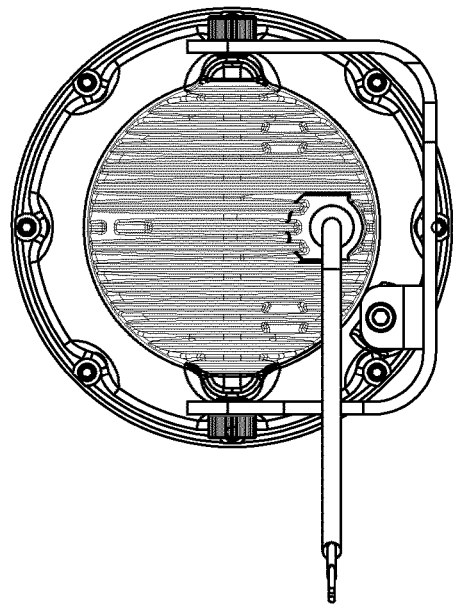
FIG. 5d depicts a rear view of one embodiment of the optical system within a mechanical housing in accordance to one, or more embodiments.
Figure 5C:
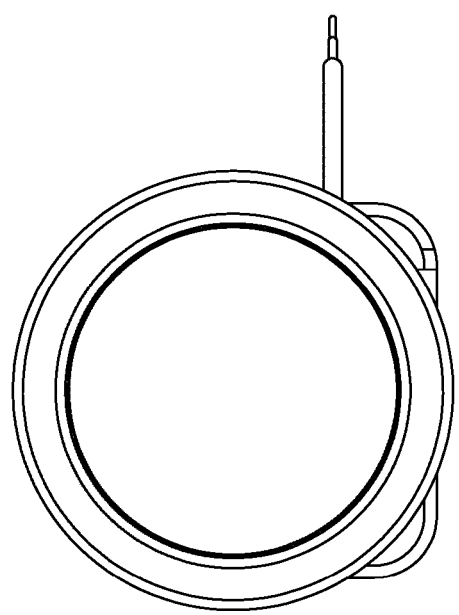
FIG. 5c depicts a front view of one embodiment of the optical system within a mechanical housing in accordance to one, or more embodiments.
Figure 5E:
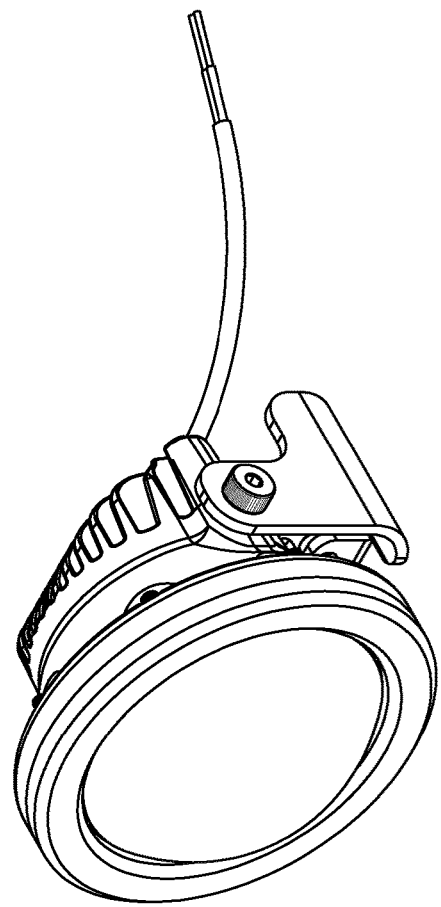
FIG. 5e depicts an isometric view of one embodiment of the optical system within a mechanical housing in accordance to one, or more embodiments.

Referring initially to FIGS. 1 and 2. In one application of the invention, a light system 100 is provided. The envelope of the system is preferably small and can fall within an approximate 2" cube that can be contained within a housing 101. A light source 102 resides essentially flush with the housing 101. The light source 102 can be an incandescent, HID, LED or other light source known to those having skill in the art. The light system 100 is a forward-facing light system in which 90-plus percent of the light emitted by the light source 102 is projected forward from the light source 102. In a particular embodiment, the light source 102 is a flat die LED smaller than approximately 5 mm square. Light is emitted from the light source 102 at an emission or beam angle, which is defined as the angle between the two planes of light where the intensity is at least 50% of the maximum intensity at center beam. Industry standard emission or beam angle is around 120 degrees.

A first refracting lens 104 is placed in the light path of the light source 102. The first refracting lens 104 is a condensing lens that is sized and placed to be in the path of at least the entire emission angle of the light source 102. The first surface 105 of the first refracting lens 104 directly in front of the given hemi-spherical emitting light source 102 encapsulates more than 120-degree source emission angle with a concave surface shape. In one embodiment, the refracting lens 104 receives a substantially larger numerical aperture than the emission angle of the light source 102. The refracting lens 104 narrows the light beam emitted from the light source 102, and while 120-degree is used to denote effective collimation of the invention, the optical design may collect close to all light from a 180-degree Lambertian source.

The first refracting lens 104 can be a positive meniscus lens with at least one positive aspheric surface. The positive meniscus optical shape collects a broad angular hemispherical source emission angle. The first refracting lens 104 may have one or more surfaces that are aspheric. The aspheric surfaces allow sufficient optical power in an optical element. The radii of the aspheric surface can be made smaller than that of a spherical surface resulting in higher optical power.

The system may also include a second refracting or condensing lens 114 to further narrow the light beam. Additional condensing lenses may be provided to further narrow the beam of light if desired. The second refracting lens 114 and additional condensing lenses can be a positive meniscus lens with at least one positive aspheric surface. The condensing lenses are to condense most of the emitted light into a reasonable numerical aperture that a collimating optic(s) 116 can easily receive. Collectively, the condensing lenses 104, 114 enable collection of a 120-degree or greater viewing angle from the light source 102 and converting the angular distribution of the emission angle from the source 102 into a reasonable angular distribution that a single optic can be used to shape an output beam into the desired optical function whether collimated emission or shaped beam pattern.

The use of two or more lenses 104, 114 is useful for at least two primary reasons: First, the ray trajectory results in incident ray angles that are near normal angle of incidence resulting in lower Fresnel Reflection losses. Second, given that rays are near a given surface normal angle of incidence, the components become less positionally sensitive resulting in assembly tolerances ideal for mass production. The source location can be on or off axis depending on the application and size of the source.

The collimating optic 116 receives the condensed beam and directs it to project in a single direction from the headlamp. The collimating optic may be a plano-convex refracting lens, a series of refractive lenses of any shape, reflective mirror(s), a binary optic, a Fresnel lens, or the like. The collimating optic 116 collects all light emitted by the one or more condensing lens(es) 104, 114 resulting in highly collimated light projection within an angular span, which is dependent on the size of the light source 102 and the focal length of the system.

The prescribed diameter of the collimating optic 116 is sized optimally to fit within a 3.5" mechanical opening after integration into a housing 101 which is a standard form factor for automotive fog lamps. The plano surface in the collimating optic 116 is purposely designed so that the plano surface can have added geometry designed to diverge the light projection along either an azimuthal or elevation axis dependent on the application. The plano surface results in a rotationally symmetric collimated light output, which may serve as a high intensity spot lamp.

Figure 6:
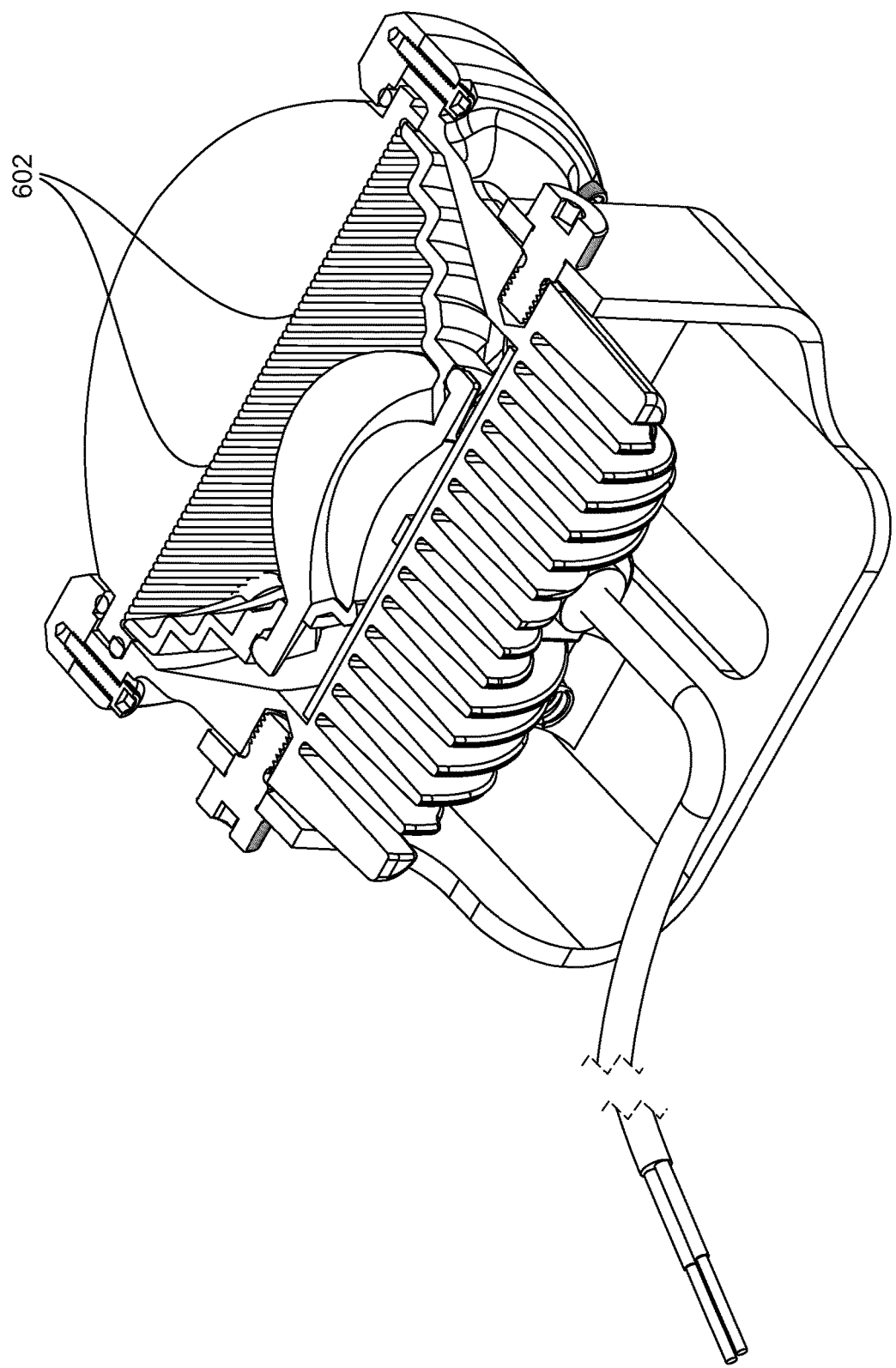
FIG. 6 depicts a cross sectional view of one embodiment of a modification to the Plano surface in the collimator by protruding lenticular flutes along an axis of the surface used to create a beam pattern that can comply with a fog and head lamp low beam requirements in accordance to one, or more embodiments.

The plano surface can be modified such that lenticular flutes 602 protruded along a single axis can be implemented resulting in a beam profile that can become compliant with fog lamp and low beam requirements, as shown in FIG. 6. Furthermore, the plano surface can also be modified to create a headlamp high beam, or other beam patterns.

By using a plano-convex lens as the collimating lens 116, the thickness of the lens is negated in the paraxial regime as the optical power is primarily defined by the convex surface.

With this said, this is highly beneficial for applications of a fog or headlamp design as installment of lenticular flutes along an axis of the plano surface act as a single axis diffuser while having no impact on the effective focal length of collimating lens 116 to first order optics. And while the thickness of the lens does impact the effective focal length, it is highly insensitive making it ideal for small surface sag lenticular flutes. Maintaining a constant focal length has the benefit of high brightness and a sharp cut offline which is often the most difficult aspect of fog or headlamp design. Gullstrand's lens equation describes this below.

Figure 10:
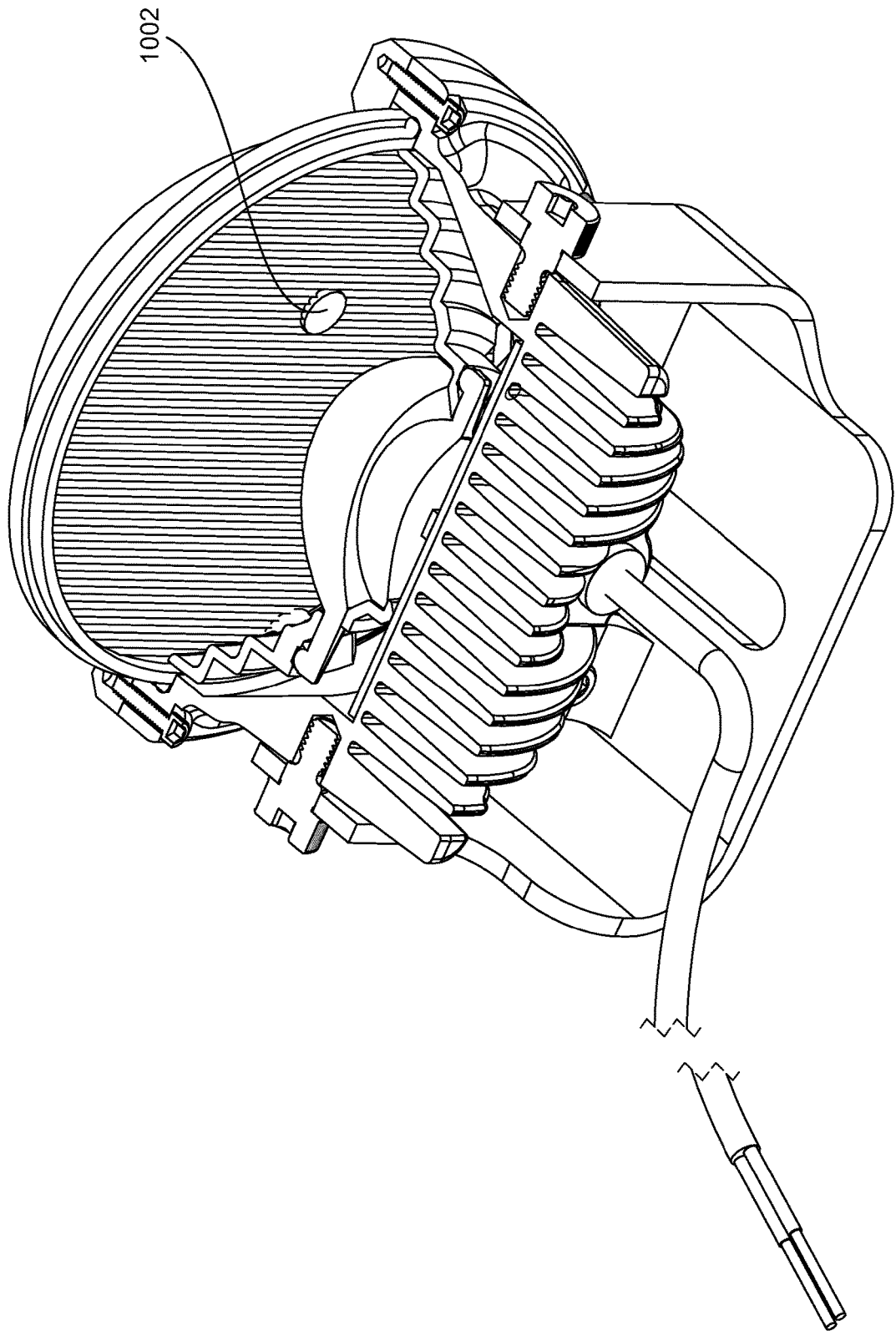
FIG. 10 depicts one embodiment of a compliant headlamp low beam according to SAE J1606 lighting codes with a wedged surface.

Power of a lens=ϕ=1/efl

ϕTotal=ϕ1+ϕ2−ϕ1ϕ2(*t*/*n*)

Where ϕ1 is the power from the first surface 118 and it, ϕ2 is the power from the second surface of 116, t is the thickness of the lens 116, and n is the refractive index of the lens 116. The plano surface 118 (ϕ2) has zero optical power and the effective focal length (efl) of the lens 116 is defined by the convex surface geometry of 124. The plano surface geometry may be modified in an array of different diffusing geometries to achieve desired optical function while maintaining first order optical properties of a prescribed lens system. The diffusion geometry can consist of lenticular flutes of varying cross-sectional profiles to symmetrically or asymmetrically diffuse light along a single axis. Off-axis fly eye lens geometries may also be incorporated to asymmetrically diffuse light along more than 1 axis. As shown in FIG. 10, wedged surface patches 1002 may also be embedded into the plano surface 118 while integrated into the corresponding diffusion geometry to angularly steer a section of the beam profile to a different angle. This embodiment is a compliant headlamp low beam according to SAE J1606 lighting codes. It is essentially the same as a fog lamp, but the wedged surface 1002 directs a bright spot in the beams profile to an angular location as defined in the specifications.

The length (L) of the system can be defined as the distance between the light source and the distal surface of the collimator. In a two-lens system, the system will have an effective focal length f that is given by:

$$\frac{1}{f} = \frac{1}{f1} + \frac{1}{f2} - \frac{t12}{f1f2}$$

$$d = \frac{ft12}{f2}$$

$$d' = -\frac{ft12}{f1}$$

where f is the effective focal length, $f^1$ is the focal length of the first lens, $f^2$ is the focal length of the second lens, and t12 is the distance between the first lenses second principal plane of the first lens and the first principal plane of the second lens. The principal plane locations can be determined by adding d to the front vertex of a lens element and d' to the rear vertex of the lens element. For the case in which lens pairs are combined, the principal planes of the single lens elements can serve as vertex locations to determine the principal plane locations of the combined system.

Figure 11:
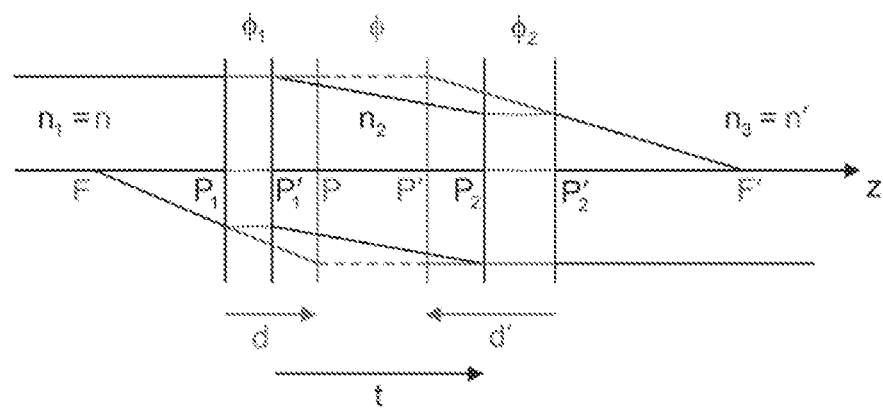
FIG. 11 depicts one embodiment of a two component system of rays and quantities that are associated with the equivalent reduced system.

The highlighted rays and quantities are associated with the equivalent reduced system per FIG. 11 and given by:

$$\phi = \phi_1 + \phi_2 - \phi_1\phi_2\tau \quad \tau = \frac{t}{n_2}$$

$$\frac{d}{n} = \frac{\phi_2}{\phi}\tau \quad \frac{d'}{n'} = -\frac{\phi_1}{\phi}\tau$$

When the system is expanded to three lenses, the efl of the first two lenses combined is determined using equation 1 above. Then that dual lens system is treated as a single lens to calculate the efl for the system including a third lens. So, the efl of the combined dual lens system ($f^c$) is given by $$\frac{1}{fc} = \frac{1}{f1} + \frac{1}{f2} - \frac{t12}{f1f2}$$

And the efl of the three-lens system ($f^t$) is approximately given by $$\frac{1}{ft} = \frac{1}{fc} + \frac{1}{f3} - \frac{tc3}{fcf3}$$

where $f^t$ is the efl of the three lens system, $f^c$ is the efl of the first two lenses of the three lens system, $f^3$ is the focal length of the third lens, and d is the distance between the second lens and the third lens corresponding principal planes. In at least one embodiment, the ratio between the efl 122 and the Total Length (L)

$$120\frac{efl}{L}$$

is less than 0.6. In one or more embodiments the focal length of the collimating lens 116 may be large enough to subtend an angular field of view less than 6 degrees.

In at least one embodiment the ratio between ½ of the emission angle ($\theta^1$) 132 (i.e., 60 in the case of a 120 degree Lambertian source) and ½ of the subtended angle ($\theta^2$) 136 (subtended by the combination of the condensing lenses 104 and 114) may be greater than 1.5 and less than 2.5 (i.e., 1.5<($\theta^1/\theta^2$)<2.5). In the case in which $\theta^1$=60 in a 120 degree Lambertian source, $\theta^2$ will be between 24 and 40 degrees.

Figure 7:
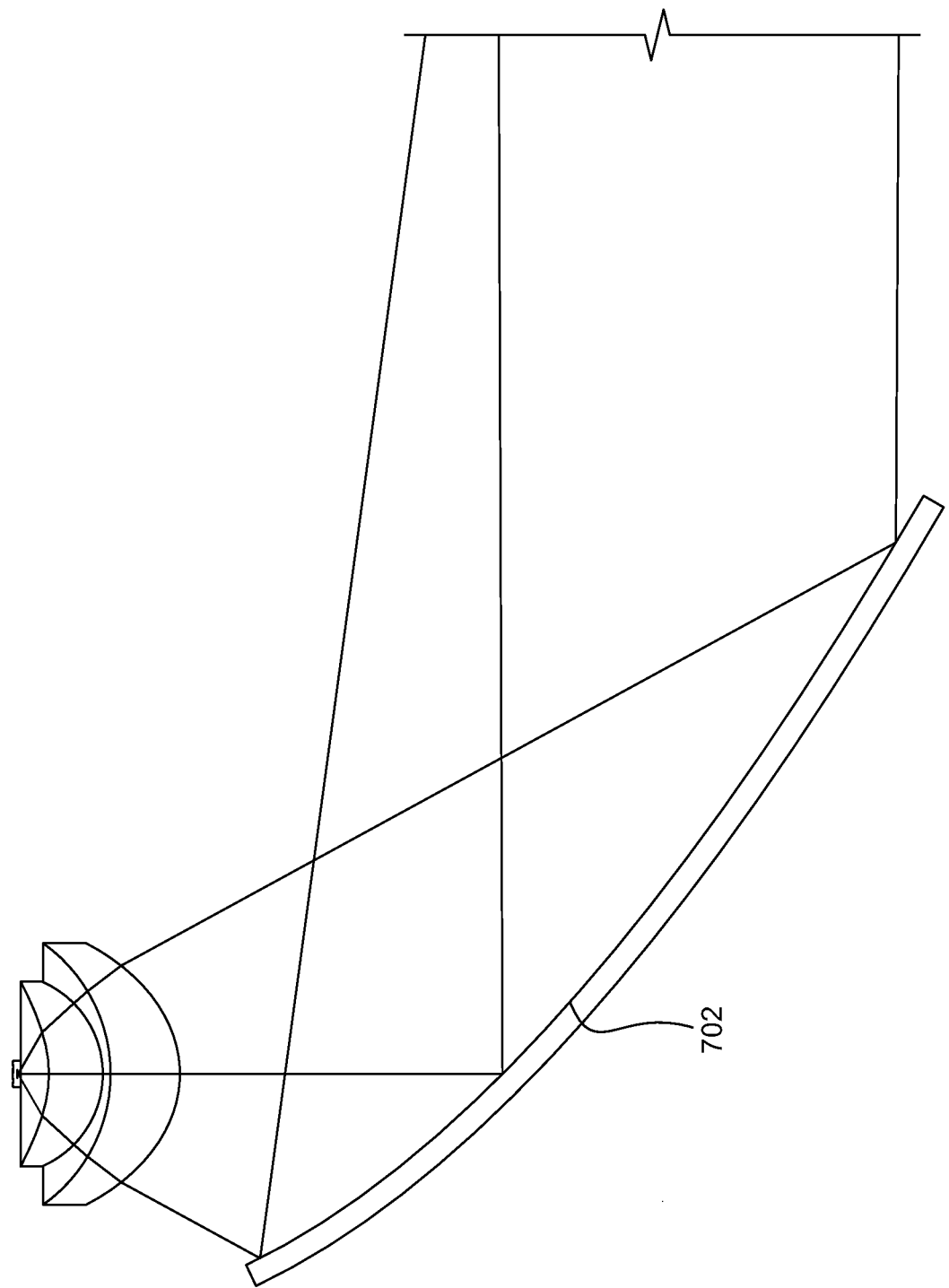
FIG. 7 depicts one embodiment of the use of a parabolic trough as a collimating optic in accordance to one, or more embodiments.

Many variants of the design form are possible. Variants of the design can use reflective mirror(s), Fresnel lens, Binary Optic, or the like, as the collimating optic, while maintaining the described function of the condensing lenses 104, 114. For example, the ability to condense light by one or more condensing lenses allows a parabolic reflector the ability to utilize less of the reflective area near the apex of the parabola while utilizing 100% of the light generated from a 120-deg source viewing angle. This decreases issues with magnification and eases the process of precisely shaping a desired beam profile. An example of this configuration is depicted in FIG. 7. FIG. 7 depicts a light source 102 placed optimally in a location such that a parabolic trough 702 collimates the light exiting the one or more condenser lenses 104 and 114 along a single axis. In the case of a reflecting mirror serving as the collimator 116, faceted parabolic or parabolic trough mirror segments can be used to shape the desired beam output to serve as a head lamp or any other intended application. And given the compact nature of the light exiting the one or more condenser lenses 104 and 114, the integration into standard automotive reflective faceted head lamp form factors is easily achievable.

Figure 8:
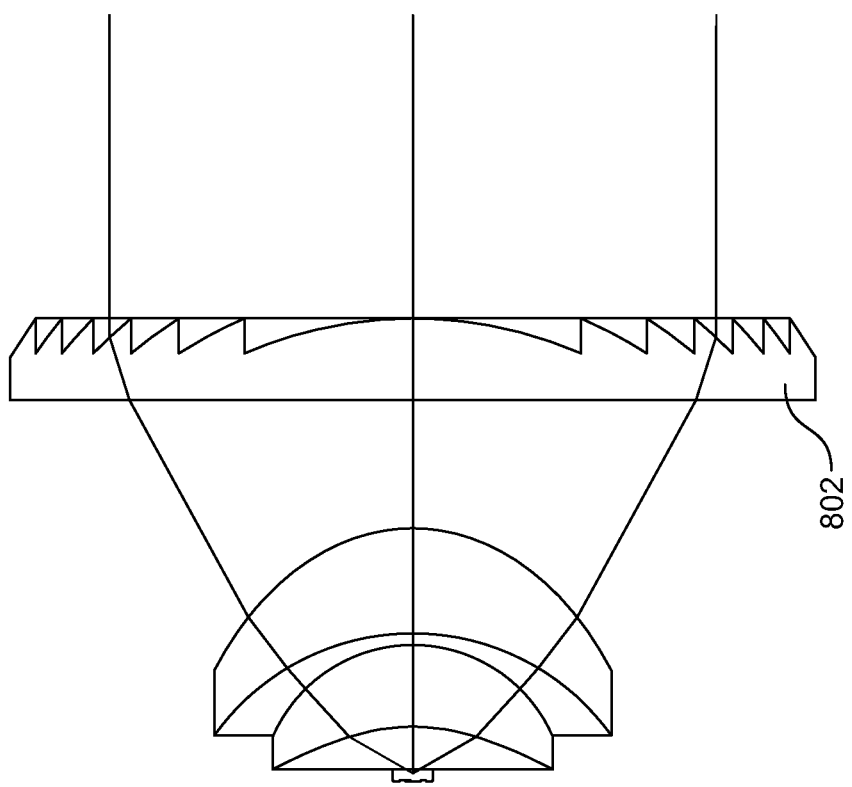
FIG. 8 depicts one embodiment of the use of a Fresnel Lens as a collimating optic in accordance to one, or more embodiments.

Referring now to FIG. 8 a Fresnel lens 802 can be used as a collimating optic. The Fresnel Lens 802 has the added benefits of enabling the ability to correct chromatic aberration by inherent dispersion properties. This Fresnel Lens 802 also has the added benefit of being able to utilize thin compact geometry, which is preferable for manufacturing purposes and piece price costs. But while the Fresnel lens 802 has these and other added benefits it does not effectively collimate all light, as zonal ray paths do not refract through the Fresnel zones resulting in light not being collimated while still utilizing 100% off all light generated from 120-degree source viewing angle.

Figure 9:
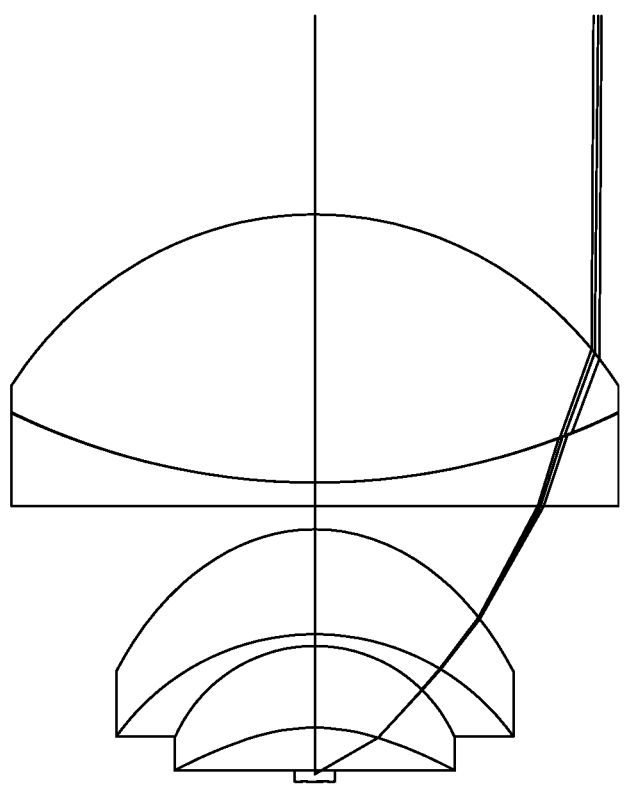
FIG. 9 depicts one embodiment of the use of a Achromatic Lens to correct for chromatic aberration.

Referring now to FIG. 9. In one or more embodiments the lens design is well corrected for spherical, coma, field curvature and astigmatic aberration, while utilizing a 120-degree source emission angle, for purposes of a forward projecting lamp. The primary aberration in the design is chromatic aberration. It is possible to create an achromatic lens in place of collimating lens 116 while maintaining a plano-convex large focal length lens that meets the above claims. The achromatic lens can be constructed of both acrylic and polycarbonate plastic.

Another variant of the design is the material selection in the condensing lenses and collimator lens. While the prescribed design both collimator and the condensing lens group is made with Polycarbonate lenses, the use of various material can be incorporated for reasons such as color correction, change in refractive index over temperature to athermalize the system, operating conditions, and spectral transmittance. Polycarbonate material selection is chosen for its high refractive index properties and manufacturing costs. Optical plastic materials in general are limited but there is a broad range of glass materials available to increase operational performances. Optical materials are also available that can transmit in different spectral regime. As an example, the material can be tailored to the Infrared spectrum.

The results of the said design shall have more than 70% effective transmission including Fresnel Reflection losses through the system. Excluding Fresnel losses, the transmission becomes greater than 96% with said source. The design results in utilizing 100% percent of a 120-degree source viewing angle over a substantial extended field of view (FOV). With application of thin-film anti-reflection coatings, the effective transmission can be greater than 90% with the said source. The design is scalable such that it can be made substantially smaller or larger. In general, the invention leverages the use of multiple sequential optical elements which results in higher efficiency in comparison to standard single element systems. Such that, with the use of optical thin film coatings, the use of multiple sequential elements, a more practical approach to the problem is developed. Similarly, the use of multiple sequential elements alleviates optical power per element enabling constant magnification with a prescribed focal length. In one example, the prescribed invention with a 2 mm square LED source emitting 1000 lumens powered at 10 watts can deliver greater than 120,000 candelas within a rotationally symmetric 4-degree beam angle with no anti-reflection coatings. It is to the inventor's knowledge that no LED based spot lamp commercially available can deliver such high beam intensity and high optical efficiency with the given power input, source size, beam angle, and size of the optical elements.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

I claim:

1. A light system emitting light along an axis and having a light source, a source side nearer to the light source, and a destination side distal to the light source, the light system comprising:
a forward-facing light source coupled to a housing, herein the light source has a first emission angle that defines a first area at a first distance from the light source through which light emitted by the light source passes, wherein the first emission angle is between about 120 and about 180 degrees;
a series of condensing lenses shaped and positioned relative to the light source to receive a numerical aperture corresponding to a full emission angle greater than 120 degrees and less than 180 degrees wherein the series of condensing lenses condenses the light into a light beam that has a second emission angle that is smaller than the first emission angle and defines a second area at a second distance from the light source;
a collimator that is larger than the last condensing lens in the series of condensing lenses and positioned relative to the series of condensing lenses to encompass the entire second area.

2. The light system of claim 1, wherein the series of condensing lenses is at least one positive meniscus lens having a concave surface, wherein the concave surface is on the source side of the positive meniscus lens.

3. The light system of claim 2, wherein the series of condensing lenses is a first positive meniscus lens and a second positive meniscus lens, each having a concave surface, wherein the first meniscus lens and the second positive meniscus lens are sequentially ordered on-axis with the concave surface of each positive meniscus lens on the source side.

4. The light system of claim 2, wherein the series of condensing lenses is substantially composed of polycarbonate.

5. The light system of claim 2, wherein the series of condensing lenses is a first positive meniscus lens and a second positive meniscus lens, each lens having a concave surface, wherein the first positive meniscus lens and the second positive meniscus lens are sequentially ordered on-axis with the concave surfaces on the source side of each positive meniscus lens.

6. The light system of claim 1, wherein the light source defines a source plane and the most distal point of the collimator defines a collimator plane, and the distance between the source plane and the collimator plane defines an axial length (L), wherein the at least one condensing lens and the collimator together have an effective focal length (efl), and wherein the ratio of the efl/L is less than about 0.6.

7. The light system of claim 1 wherein the series of condensing lenses has at least one aspheric surface.

8. The light system of claim 1, wherein the collimator comprises at least one of a plano-convex refracting lens, at least one reflective mirror, a binary optic with a plano-surface on the source side of the binary optic, or a Fresnel lens with a plano-surface on the source side of the Fresnel lens.

9. The light system of claim 1, wherein the light source is a flat Lambertian source and the system transmits at least 70% of the total power emitted from the light source including Fresnel reflection losses.

10. The light system of claim 9, wherein the system transmits at least 96% of the total power emitted from the light source excluding Fresnel reflection losses.

11. The light system of claim 1, wherein the light source is an incandescent light, an HID, or an LED.

12. The light system of claim 1, wherein the light source has a projected beam and encompasses an on-axis area in which the projected beam is un-vignetted and has an angular width of less than about 12 degrees.

13. The light system of claim 1, wherein the light emitted by the light source is subtended by a first angle, the light exiting the series of condensing lenses is subtended by a second angle that is less than the first angle, and wherein the ratio of the first angle to the second angle is between about 1.5 and 2.5.

14. The light system of claim 1, wherein the collimator has an effective focal length large enough to subtend a beam angle less than about 6 degrees when used as a fog lamp.

15. The light system of claim 1, wherein the collimator is a plano-convex lens, and wherein the plano surface of the plano-convex lens is modified to have at least one of lenticular flutes, off-axis fly eye lens geometries, or wedged surface patches.

16. The light system of claim 1, wherein the collimator is achromatic.

17. A method of providing a high intensity forward projection optical system, the method comprising the acts of:
securing a light source to a housing, wherein the light source has a first emission angle that defines a first area at a first distance from the light source through which light emitted by the light source passes;
placing a series of condensing lenses relative to the light source to to receive a numerical aperture at the condensing receiving surface corresponding to a full emission angle between about 120 and about 180 degrees and condense the light into a light beam that has a second emission angle that is smaller than the first emission angle and defines a second area at a second distance from the light source;
placing a collimator that is larger than the last condensing lens in the series of condensing lenses and positioned relative to the at least one condensing lens to encompass the entire second area, wherein the series of condensing lenses consists of one or two condensing lenses and wherein there are no other lenses between the series of condensing lenses and the collimator;
securing the housing to a vehicle having a power source and connecting the light source to the power source of the vehicle.

18. The method of claim 17, further comprising arranging the series of condensing lenses and the collimator such that together they have an effective focal length (efl), and wherein the ratio of the efl/L is less than about 0.6.

19. The method of claim 17, wherein the collimator is a plano-convex lens, the method further comprising modifying the plano surface of the plano-convex lens to have at least one of lenticular flutes within a defined area of the plano surface, and wherein the vertex of the lenticular flutes are collocated in the plane of the plano surface.

20. The method of claim 17, wherein the collimator is achromatic.

* * * * *